(12) United States Patent
Ito

(10) Patent No.: US 10,976,596 B2
(45) Date of Patent: Apr. 13, 2021

(54) SUBSTRATE FOR ELECTRO-OPTICAL DEVICE, ELECTRO-OPTICAL DEVICE, AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/114,373

(22) Filed: Aug. 28, 2018

(65) Prior Publication Data

US 2019/0064584 A1 Feb. 28, 2019

(30) Foreign Application Priority Data

Aug. 29, 2017 (JP) .............................. JP2017-164033

(51) Int. Cl.
| | | |
|---|---|---|
| *G02F 1/1335* | (2006.01) | |
| *G02F 1/1333* | (2006.01) | |
| *G02F 1/1368* | (2006.01) | |
| *G02F 1/1343* | (2006.01) | |
| *G02F 1/1362* | (2006.01) | |

(52) U.S. Cl.
CPC ...... *G02F 1/133526* (2013.01); *G02F 1/1368* (2013.01); *G02F 1/133345* (2013.01); *G02F 1/134309* (2013.01); *G02F 1/136209* (2013.01); *G02F 1/136227* (2013.01); *G02F 2001/133565* (2013.01); *G02F 2201/50* (2013.01); *G02F 2202/104* (2013.01)

(58) Field of Classification Search
CPC ................................................. G02F 1/133526
See application file for complete search history.

(56) References Cited

U.S. PATENT DOCUMENTS

| | | | | |
|---|---|---|---|---|
| 6,330,112 B1 * | 12/2001 | Kaise | ................. | G02B 27/1033 348/E9.027 |
| 2005/0146649 A1 * | 7/2005 | Sato | .................. | G02F 1/136213 349/44 |
| 2011/0013102 A1 * | 1/2011 | Miyazaki | ............. | H04N 9/3105 349/5 |

(Continued)

FOREIGN PATENT DOCUMENTS

| | | |
|---|---|---|
| JP | 2012-247598 A | 12/2012 |
| JP | 2015-34860 A | 2/2015 |

*Primary Examiner* — Michael H Caley
*Assistant Examiner* — Jonathan Y Jung
(74) *Attorney, Agent, or Firm* — Oliff PLC

(57) ABSTRACT

An element substrate of an electro-optical device (substrate for an electro-optical device) includes a first lens and a second lens. The first lens is formed between a first substrate and a switching element, and the second lens is formed between the switching element and a pixel electrode. The second lens includes a second lens concave surface and a second lens-forming lens layer. The second lens concave surface is recessed in a surface of an interlayer insulating film. The second lens-forming lens layer is filled in the inside of the second lens concave surface. The interlayer insulating film includes a contact hole in a location not overlapping, in a plan view, with the second lens concave surface. The contact hole electrically couples the pixel electrode to the switching element.

16 Claims, 11 Drawing Sheets

(56) References Cited

U.S. PATENT DOCUMENTS

| | | | |
|---|---|---|---|
| 2011/0194060 A1* | 8/2011 | Jiroku | G02F 1/136227 349/138 |
| 2015/0041833 A1* | 2/2015 | Nimura | H01L 29/78633 257/88 |
| 2016/0018568 A1* | 1/2016 | Ito | G02B 3/0056 349/57 |

* cited by examiner

SUBSTRATE FOR ELECTRO-OPTICAL DEVICE, ELECTRO-OPTICAL DEVICE, AND ELECTRONIC APPARATUS

The present application is based on and claims priority from JP Application Serial Number 2017-164033, filed Aug. 29, 2017, the disclosure of which is hereby incorporated by reference herein in its entirety.

BACKGROUND

1. Technical Field

The disclosure relates to a substrate for an electro-optical device, the substrate including lenses formed to overlap, in a plan view, with pixel electrodes. The disclosure also relates to an electro-optical device and an electronic apparatus.

2. Related Art

Electro-optical devices such as a light valve for a projection display apparatus include an electro-optical layer disposed between an element substrate, which includes pixel electrodes and switching elements, and a counter substrate, which includes a common electrode. In this regard, such electro-optical devices are configured to display images by modulating, through the electro-optical layer, light incident from one of the element substrate-side and the counter substrate-side. In the element substrate, only light that reaches the light transmission regions (pixel aperture regions), which are surrounded by, for example, lines, contributes to the display. In view of this, there is a proposal that, in an electro-optical device that receives light incident from the element substrate side, first lenses are disposed between the substrate body of the element substrate and switching elements and the first lenses may overlap, in a plan view, with respective pixel electrodes. Such a configuration makes it possible to display bright images (JP-A-2015-34860). In the electro-optical device disclosed in JP-A-2015-34860, there is a proposal that the second lenses are disposed between the switching elements and the pixel electrodes in order to optimize the inclination of light rays entering the electro-optical layer.

In the electro-optical device disclosed in JP-A-2015-34860, for forming the second lenses, a lens layer including, for example, SiON and having convex curved surfaces projecting toward the pixel electrodes are formed, and thereafter relay electrodes are formed. Thereafter, a light transmissive layer including, for example, SiO$_2$ is formed to cover the lens layer. Thus, between the relay electrodes and the pixel electrodes, the convex curved surfaces of the lens layer project, relative to the relay electrodes, toward the pixel electrodes. In addition, a light transmissive layer on the pixel electrode side is disposed over the convex curved surfaces. Thus, the film present between the pixel electrodes and the relay electrodes is thick. As a result, contact holes closest to the pixel electrodes, which are formed in an interlayer insulating film to electrically couple the pixel electrodes to the relay electrodes, have a higher aspect ratio. Consequently, the reliability of electrical coupling between the pixel electrodes and the relay electrodes may decrease.

SUMMARY

The disclosure provides a substrate for an electro-optical device, an electro-optical device, and an electronic apparatus, which are capable of electrically coupling pixel electrodes to relay electrodes appropriately even in the case that lenses are disposed between switching elements and the pixel electrodes.

According to an aspect of the disclosure, a substrate for an electro-optical device includes a first substrate, a pixel electrode provided on a first surface side of the first substrate, a plurality of interlayer insulating films stacked between the first substrate and the pixel electrode, a switching element provided between the first substrate and the plurality of interlayer insulating films, the switching element being electrically coupled to the pixel electrode, a first lens between the first substrate and the switching element, the first lenses overlapping, in a plan view, with the pixel electrode, and a second lens between the switching element and the pixel electrode, the second lens overlapping, in a plan view, with the pixel electrode. The second lens includes a second lens concave surface and a second lens-forming lens layer, the second lens concave surface being recessed toward the first substrate from a surface of a first interlayer insulating film of the plurality of interlayer insulating films on a pixel electrode side, the first interlayer insulating film of the plurality of interlayer insulating films being located on the pixel electrode side, the second lens-forming lens layer being filled in an inside of the second lens concave surface, the second lens-forming lens layer having a refractive index different from a refractive index of the first interlayer insulating film. The first interlayer insulating film includes a contact hole in a location not overlapping, in a plan view, with the second lens concave surface, the contact hole electrically coupling the pixel electrode to the switching element.

According to some aspects of the disclosure, the first lens is disposed between the first substrate and the switching element, and the second lens is disposed between the switching element and the pixel electrode. Accordingly, light traveling toward light shielding portions, such as wiring lines and the like, is directed toward light transmission regions (pixel aperture regions), and the inclination and the like of the light rays that are emitted from the substrate for an electro-optical device can be corrected. Furthermore, the second lens is configured such that the second lens concave surface is recessed toward the first substrate from the surface of the first interlayer insulating film on the pixel electrode side and that the second lens-forming lens layer is filled in the inside of the second lens concave surface. As a result, the depth of the contact holes, which are formed in the first interlayer insulating film to electrically couple the pixel electrodes to the switching elements, is substantially equal to the thickness of the first interlayer insulating film or the sum of the thickness of the first interlayer insulating film and the thickness of a portion deposited on the first interlayer insulating film outside the second lens concave surface, of the second lens-forming lens layer. Consequently, the aspect ratio of the contact hole is small, and thus, even in the case that the second lenses are disposed between the switching elements and the pixel electrodes, the pixel electrodes can be electrically coupled to relay electrodes appropriately.

According to another aspect of the disclosure, the pixel electrode may have a substantially quadrilateral shape in a plan view, and the contact hole may overlap, in a plan view, with a corner portion of the pixel electrode. According to some aspects of the disclosure, the phrase "the pixel electrode has a substantially quadrilateral shape in a plan view" means that the pixel electrode generally has a substantially quadrilateral shape, and thus the shape may include, for example, a cutout or a projection formed at the outer edge of the pixel electrode. With the aspect, the contact hole can be easily provided in a location not overlapping with the second lens concave surface because the region between corner portions of two pixel electrodes diagonally located is a region where the second lens concave surface is not formed.

According to another aspect of the disclosure, a surface of the second lens-forming lens layer on the pixel electrode side and the surface of the first interlayer insulating film on the pixel electrode side may constitute a continuous flat surface. With the aspect, the second lens-forming lens layer is not formed outside the second lens concave surface, and thus the depth of the contact hole does not include the thickness of the second lens-forming lens layer. Consequently, the aspect ratio of the contact hole is small, and thus the pixel electrodes can be electrically coupled to relay electrodes appropriately.

According to another aspect of the disclosure, a relay electrode electrically coupled to the switching element may be provided between a second interlayer insulating film of the plurality of interlayer insulating films and the first interlayer insulating film, the second interlayer insulating film overlapping with the first interlayer insulating film on a first substrate side, and the pixel electrode may be electrically coupled to the relay electrode via the contact hole. In this case, the second lens concave surface may extend from the surface of the first interlayer insulating film on the pixel electrode side, and may reach the second interlayer insulating film. With the aspect, the design flexibility in designing the second lens concave surface, regarding the depth and the like of the second lens concave surface, is high. Consequently, the lens properties of the second lenses can be designed appropriately.

According to another aspect of the disclosure, the first lens in a plan view may have a size larger than a size of the second lens in a plan view. With the aspect, light that has entered the substrate for the electro-optical device from the first substrate side is efficiently directed to the pixel electrodes.

According to another aspect of the disclosure, an insulating protective layer may be formed between the second lens-forming lens layer and the pixel electrodes.

According to another aspect of the disclosure, the first lens may include a first lens concave surface on a surface of the first substrate on the switching elements side, and the first lens may include a first lens-forming lens layer filled in an inside of the first lens concave surface.

According to another aspect of the disclosure, a light shielding layer may be provided between the switching element and the first substrate, the light shielding layer including an aperture that overlaps, in a plan view, with the first lens, and the light shielding layer may overlap, in a plan view, with the switching element. With the aspect, light traveling toward the switching elements, of the light that has entered the substrate for the electro-optical device from the first substrate side, can be blocked by the light shielding layer.

According to another aspect of the disclosure, an electro-optical device including the substrate for an electro-optical device, to which the disclosure is applied, may include a counter substrate including a second substrate facing the substrate for the electro-optical device, and a common electrode formed on a surface of the substrate for the electro-optical device in the second substrate, and an electro-optical layer disposed between the substrate for the electro-optical device and the counter substrate.

According to another aspect of the disclosure, the electro-optical device may be configured to accept light entering the electro-optical layer from the substrate for an electro-optical device side.

According to another aspect of the disclosure, the electro-optical device may be configured such that no lenses are disposed in the second substrate. With the aspect, a situation in which the lenses of the first substrate and the lenses of the second substrate are misaligned from each other when the first substrate and the second substrate are bonded together to assemble an electro-optical device does not occur.

The electro-optical device according to the disclosure may be used in a variety of electronic apparatuses. According to the disclosure, in the case that the electro-optical device is used in a projection display apparatus of electro-optical apparatuses, the projection display apparatus may be provided with a light source unit configured to emit light to be supplied to the electro-optical device and a projection optical system configured to project light modulated by the electro-optical device.

BRIEF DESCRIPTION OF THE DRAWINGS

Embodiments of the disclosure will be described with reference to the accompanying drawings, wherein like numbers reference like elements.

FIG. 9 is a cross-sectional view illustrating steps of a method for producing the first lenses illustrated in FIG. 7 and the like.

FIG. 10 is a cross-sectional view illustrating steps of a method for producing the second lenses illustrated in FIG. 7 and the like.

DESCRIPTION OF EXEMPLARY EMBODIMENTS

Figure 1:
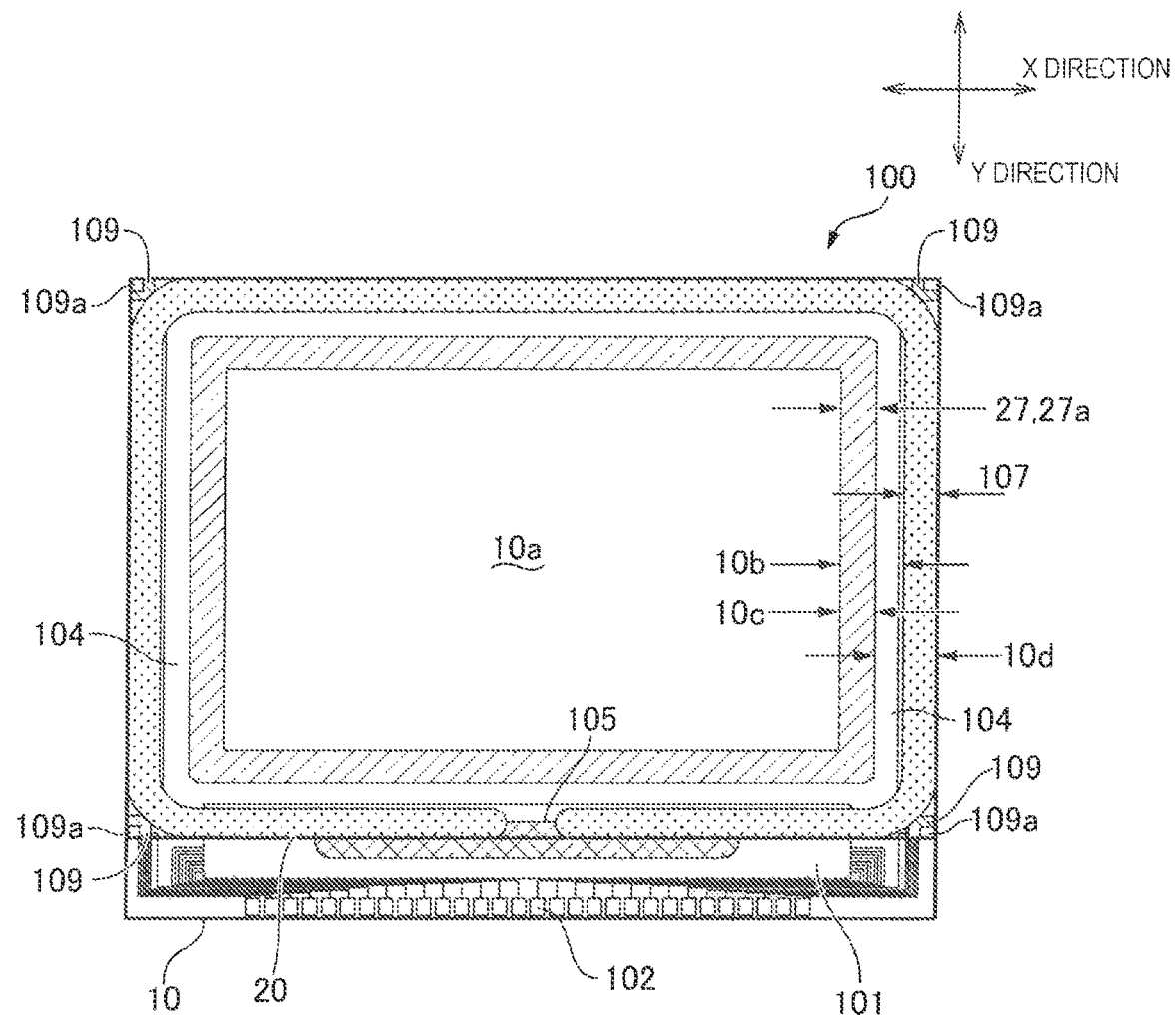
FIG. 1 is a plan view of an electro-optical device to which the disclosure is applied.

Exemplary embodiments of the disclosure will be described with reference to the accompanying drawings. In the drawings that will be referenced in the following description, in order to make each of the layers, members, and the like recognizable in terms of size, the layers, members, and the like are not drawn to scale. In addition, in the following description, when layers formed in the element substrate are described, the term "upper" ("over") or "front" refers to the side opposite to the side on which the substrate is located (side on which the counter substrate is located), and the term "lower" ("under") refers to the side on which the substrate is located.

Configuration of Electro-Optical Device

Figure 2:
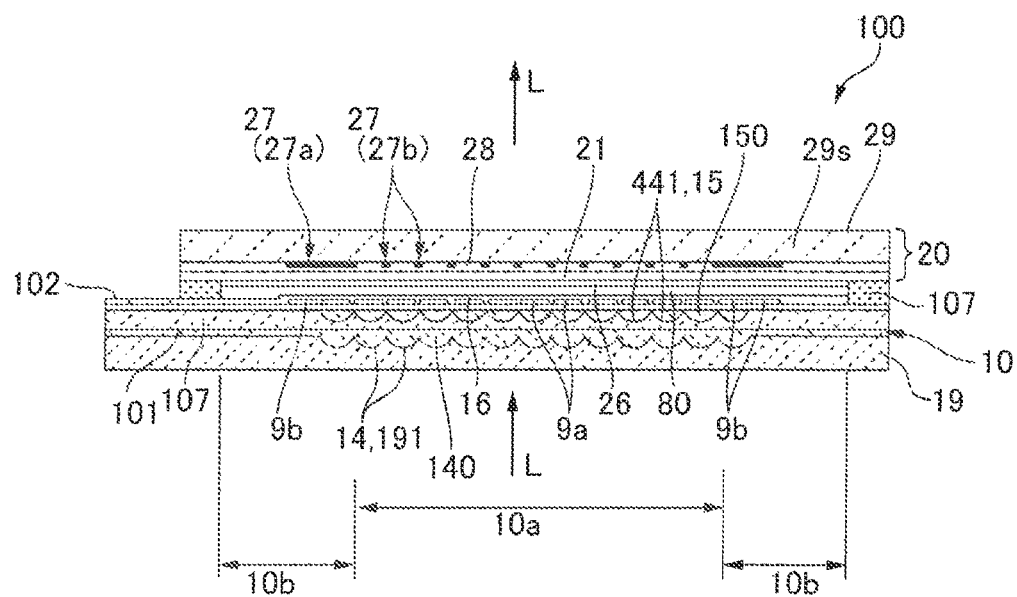
FIG. 2 is a cross-sectional view of the electro-optical device illustrated in FIG. 1.

FIG. 1 is a plan view of an electro-optical device 100, to which the disclosure is applied. FIG. 2 is a cross-sectional view of the electro-optical device 100 illustrated in FIG. 1. As illustrated in FIGS. 1 and 2, the electro-optical device 100 includes an element substrate 10 and a counter substrate 20, which are bonded together via a sealing member 107, with a predetermined gap in between. Thus, the element substrate 10 and the counter substrate 20 face each other. The sealing member 107 is disposed in a frame shape along the outer edge of the counter substrate 20. An electro-optical layer 80 including liquid crystal layers and the like is disposed in the region surrounded by the sealing member 107, between the element substrate 10 and the counter substrate 20. Thus, the electro-optical device 100 is configured as a liquid crystal device. The sealing member 107 is a photocurable adhesive or a photocurable and thermosetting adhesive and contains a gap material, such as glass fibers or glass beads for providing a distance of a predetermined value between the two substrates. The element substrate 10 and the counter substrate 20 each have a quadrilateral shape. A display region 10a, which is an area of a quadrilateral shape, is disposed at a substantially central position of the electro-optical device 100. To correspond to such shapes, the sealing member 107 is also disposed in a substantially quadrilateral shape. A peripheral region 10b, which has a rectangular frame shape, is disposed between the inner peripheral edge of the sealing member 107 and the outer peripheral edge of the display region 10a.

The element substrate 10 includes a first substrate 19, such as a quartz substrate or a glass substrate, which serves as a substrate body and is light transmissive. On a first surface 19s side, which is closer to the counter substrate 20, of the first substrate 19, in outer sides of the display region 10a, a data line drive circuit 101 and a plurality of terminals 102 are formed along one side of the element substrate 10. A scan line drive circuit 104 is formed along another side that is adjacent to the above-described one side. A flexible printed circuit (not illustrated) is coupled to the terminals 102. Various electric potentials and various signals are input to the element substrate 10 via the flexible printed circuit. Also, on the first surface 19s side of the first substrate 19, in the display region 10a, a plurality of pixel electrodes 9a, which are light transmissive and made of an indium tin oxide (ITO) film and the like, and switching elements (not illustrated in FIG. 2), which are electrically coupled to each of the plurality of pixel electrodes 9a, are formed in a matrix form. A first alignment film 16 is formed on the pixel electrodes 9a on the counter substrate 20 side. The pixel electrodes 9a are covered with the first alignment film 16.

The counter substrate 20 includes a second substrate 29, which serves as a substrate body and is light transmissive. Examples of the second substrate 29 include quartz substrates and glass substrates. In the second substrate 29, on a first surface 29s, which faces the element substrate 10, a common electrode 21, which is made of an ITO film and the like and is light transmissive, is formed. A second alignment film 26 is formed on the common electrode 21 on the element substrate 10 side. The common electrode 21 is formed across substantially the entirety of the first surface 29s of the second substrate 29 and covered with the second alignment film 26. On the first surface 29s of the second substrate 29, light shielding layers 27, which are made of a resin, metal, or a metal compound and which are light transmissive, are formed on a opposite side to the element substrate 10 with respect to the common electrode 21. The light shielding layers 27 include a parting portion 27a, which has a frame shape extending along the outer peripheral edge of the display region 10a. The light shielding layers 27 also include light shielding layers 27b, which are located on regions overlapping, in a plan view, with regions each of which is sandwiched between adjacent ones of the pixel electrodes 9a. In this exemplary embodiment, in the peripheral region 10b of the element substrate 10, in a dummy pixel region 10c, which overlaps, in a plan view, with the parting portion 27a, dummy pixel electrodes 9b, which are formed simultaneously with the pixel electrodes 9a, are formed.

The first alignment film 16 and the second alignment film 26 are inorganic alignment films (vertical alignment films) each including an obliquely-deposited film that may include, for example, $SiO_x$ (x<2), $SiO_2$, $TiO_2$, MgO, or $Al_2O_3$. The first alignment film 16 and the second alignment film 26 cause the liquid crystal molecules used in the electro-optical layer 80 to be obliquely aligned. The liquid crystal molecules have negative dielectric anisotropy. Thus, the liquid crystal molecules have a predetermined angle with respect to the element substrate 10 and the counter substrate 20. As described, the electro-optical device 100 is configured as a liquid crystal device of the vertical alignment (VA) mode.

The element substrate 10 includes inter-substrate electrical coupling electrodes 109 at regions overlapping with the corners of the counter substrate 20 at outer sides of the sealing member 107. The inter-substrate electrical coupling electrodes 109 are provided to establish electrical continuity between the element substrate 10 and the counter substrate 20. An inter-substrate electrical coupling member 109a, which includes electrically conductive particles, are deposited at the inter-substrate electrical coupling electrode 109. The common electrode 21 of the counter substrate 20 is electrically coupled to the element substrate 10 side via the inter-substrate electrical coupling members 109a and the inter-substrate electrical coupling electrodes 109. Thus, a common electric potential is applied to the common electrode 21 from the element substrate 10 side.

In the electro-optical device 100 according to this exemplary embodiment, the pixel electrodes 9a and the common electrode 21 each include an ITO film (light transmissive electrically conductive film). The electro-optical device 100 is configured as a transmissive liquid crystal device. In the electro-optical device 100, while light passes through one of the element substrate 10 or the counter substrate 20, and enters the electro-optical layer 80, then passes through the other of the substrates, and is emitted, the light is modulated to display images. In this exemplary embodiment, as indicated by an arrow L, while light enters the element substrate 10 and passes through the counter substrate 20, and is then emitted, the light is modulated by the electro-optical layer 80 for each of the pixels and an image is displayed.

Specific Configuration of Pixels

Figure 3:
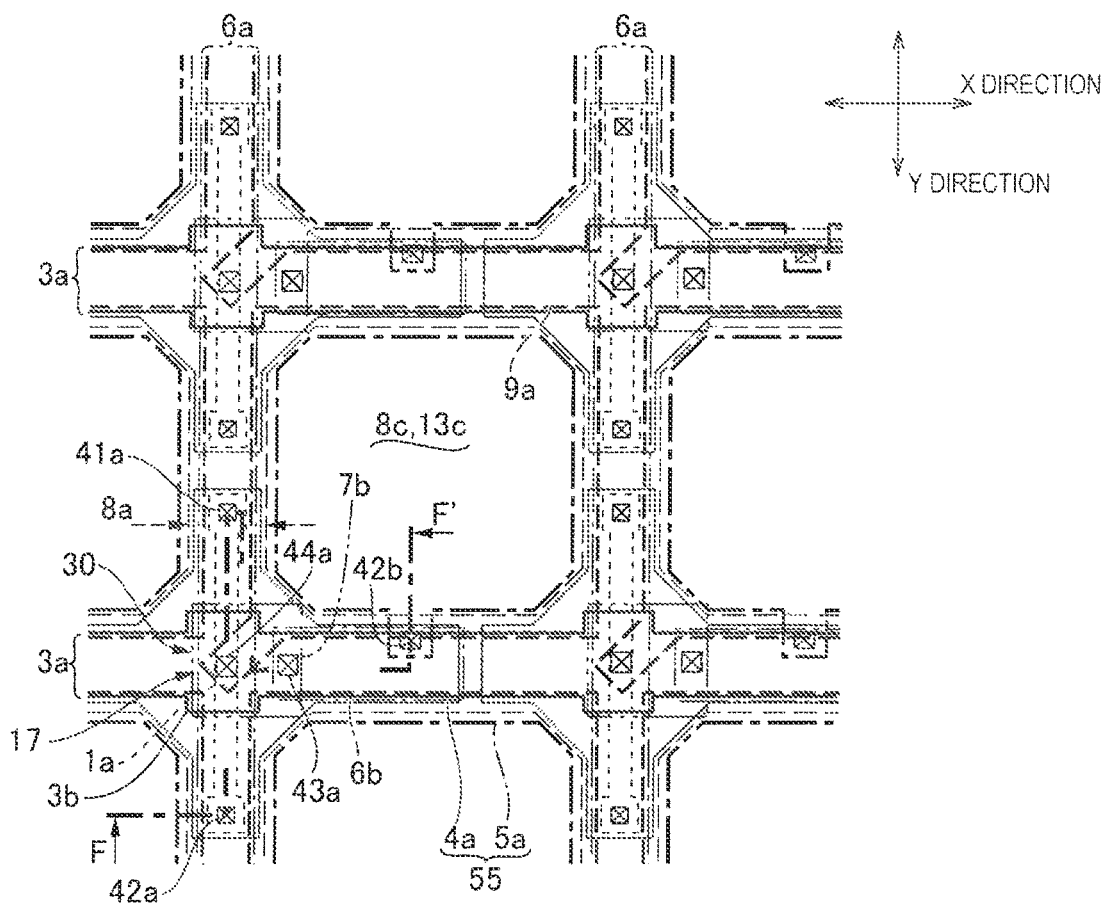
FIG. 3 is a plan view of a plurality of adjacent pixels in the electro-optical device illustrated in FIG. 1.
Figure 4:
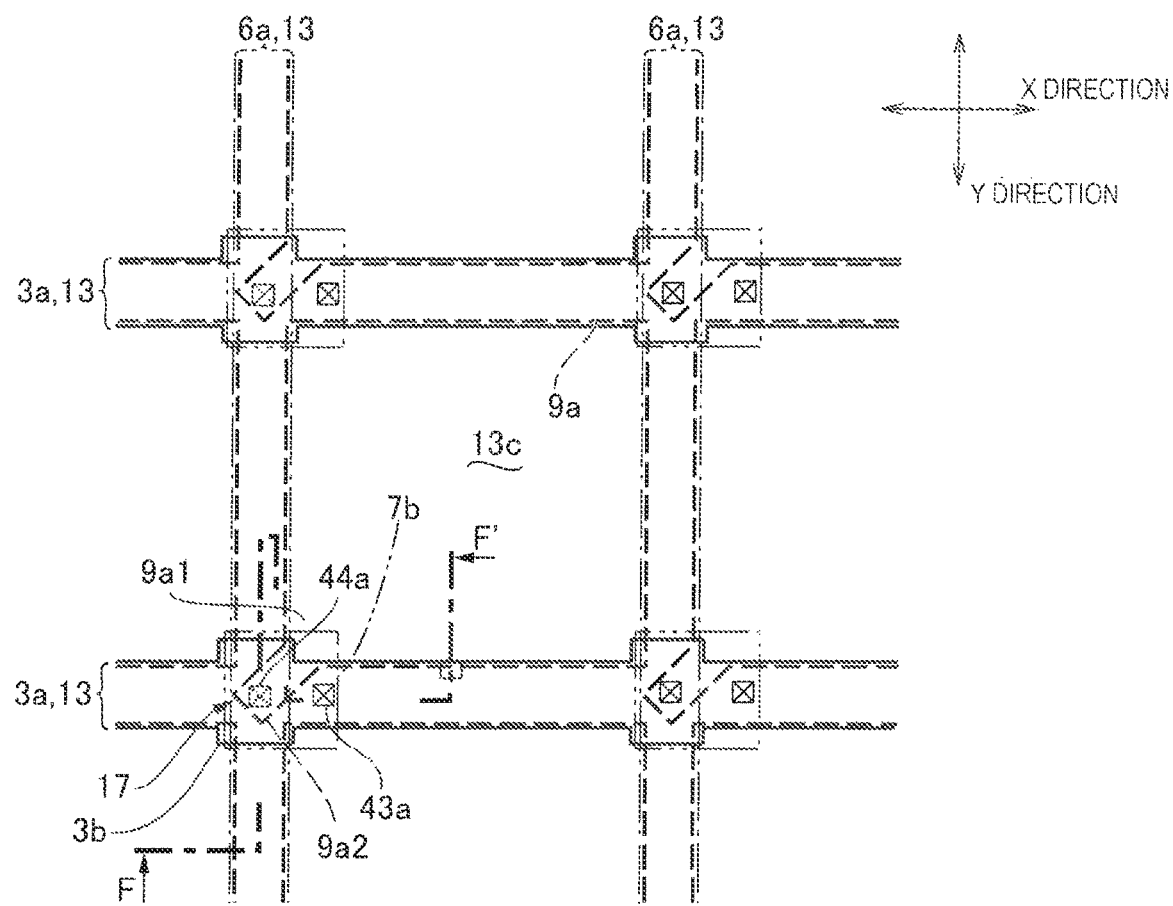
FIG. 4 is a plan view illustrating layouts of scan lines, data lines, relay electrodes, pixel electrodes, and the like of the constituent elements illustrated in FIG. 3.
Figure 5:
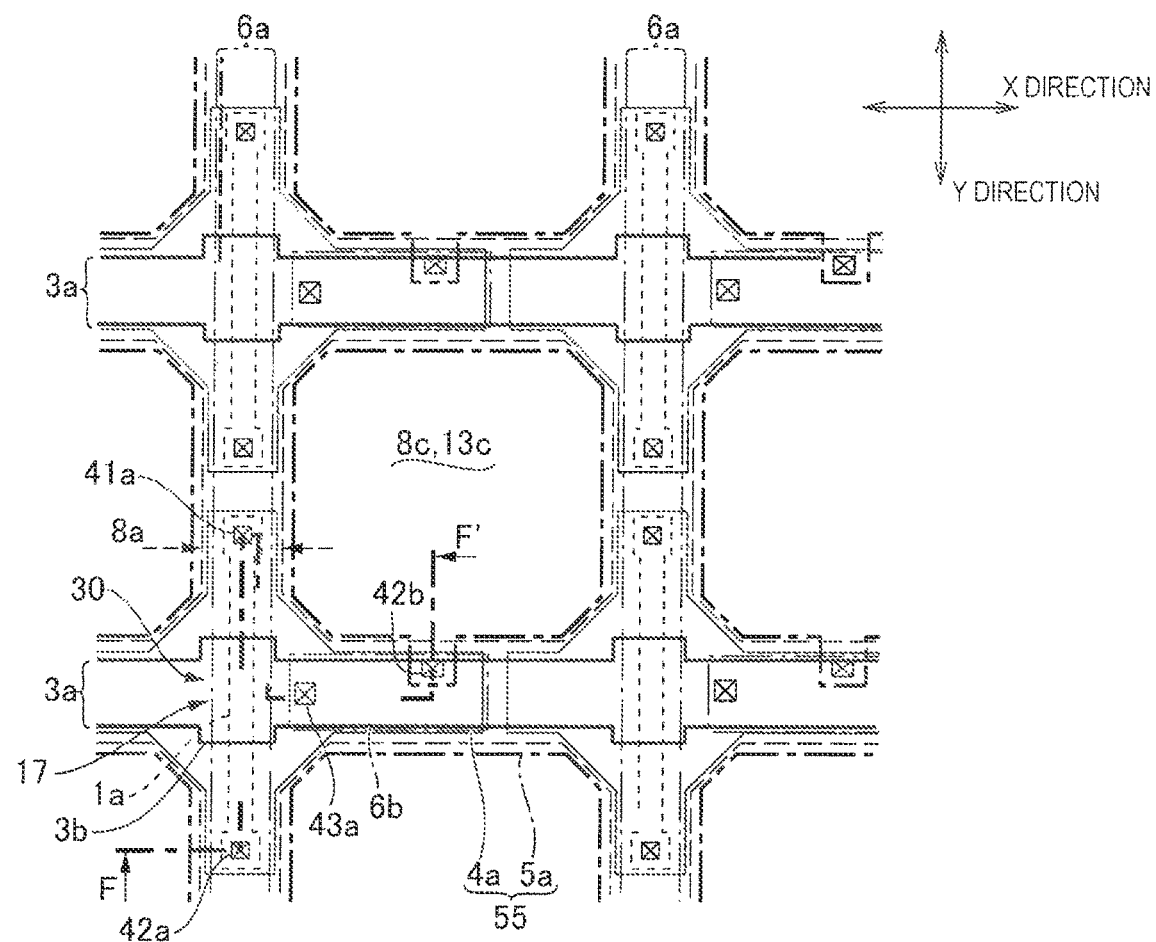
FIG. 5 is a plan view in which the pixel electrodes and the relay electrodes are not illustrated from FIG. 3.
Figure 6:
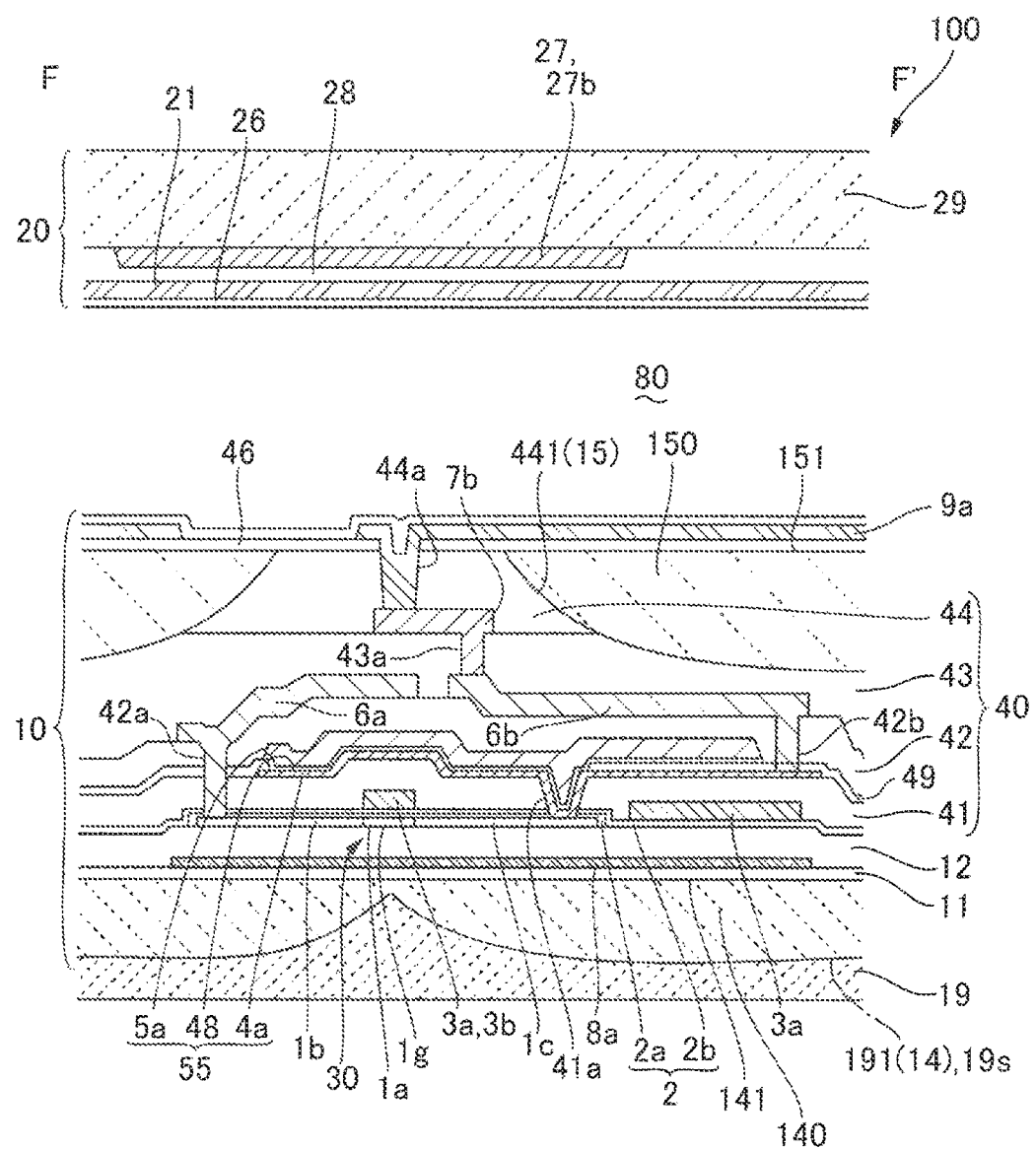
FIG. 6 is an F-F' cross-sectional view of the electro-optical device illustrated in FIG. 1.

FIG. 3 is a plan view of a plurality of adjacent pixels in the electro-optical device 100 illustrated in FIG. 1. FIG. 4 is a plan view illustrating layouts of scan lines 3a, data lines 6a, relay electrodes 7b, pixel electrodes 9a, and the like of the constituent elements illustrated in FIG. 3. FIG. 5 is a plan view in which the pixel electrodes 9a and the relay electrodes 7b are omitted from FIG. 3. FIG. 6 is an F-F' cross-sectional view of the electro-optical device 100 illustrated in FIG. 1. In FIGS. 3, 4, and 5, the layers are indicated by the lines described below. In addition, in FIGS. 3, 4, and 5, layers of which ends overlap with each other in a plan view are drawn such that the ends are displaced relative to each other to clearly illustrate shapes and the like of the layers. In addition, in FIG. 6, the position of a contact hole 43a is displaced for illustration purposes.

Light shielding layer 8a: long thin dashed line
Semiconductor layer 1a: short thin dotted line
Scan line 3a: thick solid line
Drain electrode 4a: thin solid line
Data line 6a and relay electrode 6b: thin dash-dot line
Capacitance line 5a: thick dash-dot line
Relay electrode 7b: thin dash-dot-dot line
Pixel electrode 9a: thick dashed line As illustrated in FIGS. 3, 4, and 5, the pixel electrodes 9a are formed adjacent to a surface, facing the counter substrate 20, of the element substrate 10. The pixel electrodes 9a are formed for a plurality of respective pixels. Data lines 6a and scan lines 3a are formed along inter-pixel regions each of which is sandwiched between adjacent ones of the pixel electrodes 9a. The inter-pixel regions each extend in a vertical or transverse direction. The scan lines 3a extend linearly along first inter-pixel regions, which extend in an X-direction, of the inter-pixel regions. The data lines 6a extend linearly along second inter-pixel regions, which extend in a Y-direction. Switching elements 30 are formed corresponding to the intersections between the data lines 6a and the scan lines 3a. In this exemplary embodiment, the switching elements 30 are formed by utilizing intersection regions 17 of the data lines 6a and the scan lines 3a and the vicinities. The capacitance line 5a is formed in the element substrate 10. A common electric potential is applied to the capacitance line 5a. The capacitance line is formed in a lattice form and extends overlapping the scan lines 3a and the data lines 6a. A light shielding layer 8a is formed under the switching elements 30. The light shielding layer 8a is in a lattice form and extends overlapping with the scan lines 3a and the data lines 6a.

As illustrated in FIG. 6, in the element substrate 10, first lenses 14 to be described later are formed on the first surface 19s of the first substrate 19. An insulating film 11, which is made of, for example, a silicon oxide film and is light transmissive, is formed over the first lenses 14 (on the opposite side to the first substrate 19). The light shielding layer 8a is formed on the insulating film 11. The light shielding layer 8a is made of an electrically conductive film, such as an electrically conductive polysilicon film, a metal silicide film, a metal film, a metal compound film, and the like. The light shielding layer 8a extends along the scan lines 3a and the data lines 6a, between the first substrate 19 and the switching elements 30. First apertures 8c are provided to correspond to regions overlapping, in a plan view, with the respective pixel electrodes 9a. The light shielding layer 8a is made of a light shielding film, such as tungsten silicide (WSi), tungsten, or titanium nitride. The light shielding layer 8a prevents an occurrence, in the switching elements 30, of malfunction due to photo current, which is caused by light passing through the element substrate 10 entering the semiconductor layers 1a, which will be described later. In some cases, the light shielding layer 8a may be configured as scan lines. In such cases, the light shielding layer 8a is configured to be electrically conductive with gate electrodes 3b, which will be described later.

On the first surface 19s side of the first substrate 19, on an upper layer side of the light shielding layer 8a, an insulating film 12 made of a silicon oxide film and is light transmissive is formed. The switching elements 30, each of which includes the semiconductor layer 1a, are formed over the insulating film 12. The switching element 30 includes the semiconductor layer 1a and the gate electrode 3b. The semiconductor layer 1a is disposed with its longitudinal direction parallel to the extension direction of the data line 6a. The gate electrode 3b extends in a direction orthogonal to the longitudinal direction of the semiconductor layer 1a and overlaps with a central portion of the semiconductor layer 1a in the longitudinal direction. In this exemplary embodiment, the gate electrode 3b is formed of a portion of the scan line 3a. The switching element 30 includes a gate insulating layer 2, which is light transmissive, between the semiconductor layer 1a and the gate electrode 3b. The semiconductor layer 1a includes a channel region 1g facing the gate electrode 3b with the gate insulating layer 2 interposed in between, a source region 1b, and a drain region 1c, which are disposed on the opposite sides of the channel region 1g. In this exemplary embodiment, the switching element 30 has an LDD structure. Thus, the source region 1b and the drain region 1c each include a lightly doped region, which is located on each side of the channel region 1g, and each include a heavily doped region in a region adjacent to the lightly doped region, on the side opposite to the channel region 1g.

The semiconductor layer 1a is made of a polysilicon film (polycrystalline silicon film) and the like. The gate insulating layer 2 has a two-layer structure including a first gate insulating layer 2a and a second gate insulating layer 2b. The first gate insulating layer 2a includes a silicon oxide film obtained by thermally oxidizing the film for the semiconductor layer 1a. The second gate insulating layer 2b includes a silicon oxide film formed by low-pressure CVD and the like. The gate electrode 3b and the scan line 3a include an electrically conductive film such as an electrically conductive polysilicon film, a metal silicide film, a metal film, or a metal compound film.

An interlayer insulating film 41, which is made of a silicon oxide film and which is light transmissive, is formed on an upper layer side of the gate electrodes 3b, and drain electrodes 4a are formed on the interlayer insulating film 41. The drain electrode 4a is made of an electrically conductive film, such as an electrically conductive polysilicon film, a metal silicide film, a metal film, or a metal compound film. The drain electrodes 4a are formed to partially overlap with the drain electrodes 1c of the semiconductor layers 1a. The drain electrodes 4a are electrically conductive with the respective drain regions 1c via respective contact holes 41a, which extend through the interlayer insulating film 41 and the gate insulating layer 2.

An etching stopper layer 49, which is made of a silicon oxide film and which is light transmissive, and a dielectric layer 48, which is light transmissive, are formed on the drain electrodes 4a. The capacitance line 5a is formed on the dielectric layers 48. A silicon compound film, such as a silicon oxide film or a silicon nitride film can be used for the dielectric layer 48. The capacitance line 5a is made of an electrically conductive film, such as an electrically conductive polysilicon film, a metal silicide film, a metal film, or a metal compound film. The capacitance line 5a overlaps with the drain electrodes 4a, with the dielectric layers 48 interposed between the capacitance line 5a and the drain electrodes 4a, and constitutes a retained capacitance 55.

An interlayer insulating film 42, which is made of a silicon oxide film and the like and which is light transmissive, is formed on the capacitance line 5a. On the interlayer insulating film 42, the data lines 6a and the relay electrodes 6b are formed on the interlayer insulating film 42. The data lines 6a and the relay electrodes 6b are formed of the same electrically conductive films. The date line 6a and the relay electrode 6b are each made of an electrically conductive film, such as an electrically conductive polysilicon film, a metal silicide film, a metal film, or a metal compound film. The data lines 6a are electrically conductive with the source regions 1b via contact holes 42a, which extend through the interlayer insulating film 42, the etching stopper layer 49, the interlayer insulating film 41, and the gate insulating layer 2. The relay electrodes 6b are electrically conductive with the drain electrodes 4a via respective contact holes 42b, which extend through the interlayer insulating film 42 and the etching stopper layer 49.

An interlayer insulating film 43, which is made of a silicon oxide film and which is light transmissive, is formed on the data lines 6a and the relay electrodes 6b. The relay electrodes 7b are formed on the interlayer insulating film 43. The relay electrode 7b is made of an electrically conductive film, such as an electrically conductive polysilicon film, a metal silicide film, a metal film, or a metal compound film. The relay electrodes 7b are electrically conductive with the relay electrodes 6b via contact holes 43a, which extend through the interlayer insulating film 43.

An interlayer insulating film 44, which is made of a silicon oxide film and the like and which is light transmissive, is formed on the relay electrodes 7b. The pixel electrodes 9a, each of which is made of an ITO film and the like, are formed on the interlayer insulating film 44. Contact holes 44a are formed in the interlayer insulating film 44 and extend to reach the respective relay electrodes 7b. The pixel electrodes 9a are electrically coupled to the respective relay electrodes 7b via the respective contact holes 44a. As a result, the pixel electrodes 9a are electrically coupled to the drain regions 1c of the respective switching elements 30 via the relay electrodes 7b, the relay electrodes 6b, and the drain electrodes 4a. The surface of the interlayer insulating film 44 is planarized. The first alignment film 16, which is made of polyimide or an inorganic alignment film and which is light transmissive, is formed on the surface of the pixel electrodes 9a.

In this exemplary embodiment, a protective layer 46 is formed between the interlayer insulating film 44 and the pixel electrodes 9a. The protective layer 46 is made of boron-doped silicate glass (BSG film). Thus, the contact hole 44a extends through the protective layer 46 and the interlayer insulating film 44 and reaches the relay electrode 7b. Inside the contact hole 44a, the pixel electrode 9a is electrically coupled to the relay electrode 7b at the bottom of the contact hole 44a. However, another configuration that the interior of the contact hole 44a is filled with a metal film, such as tungsten, as a plug, and the pixel electrode 9a is electrically coupled to the relay electrode 7b via the plug within the contact hole 44a.

In the element substrate 10, configured as described above, the scan lines 3a, the capacitance line 5a, and the data lines 6a collectively form a light shielding layer 13a between the switching elements 30 and the pixel electrodes 9a. The light shielding layer 13a includes second apertures 13c, which correspond to regions overlapping, in a plan view, with the respective pixel electrodes 9a and the respective first apertures 8c.

Configuration of Lenses of Element Substrate 10

Figure 7:
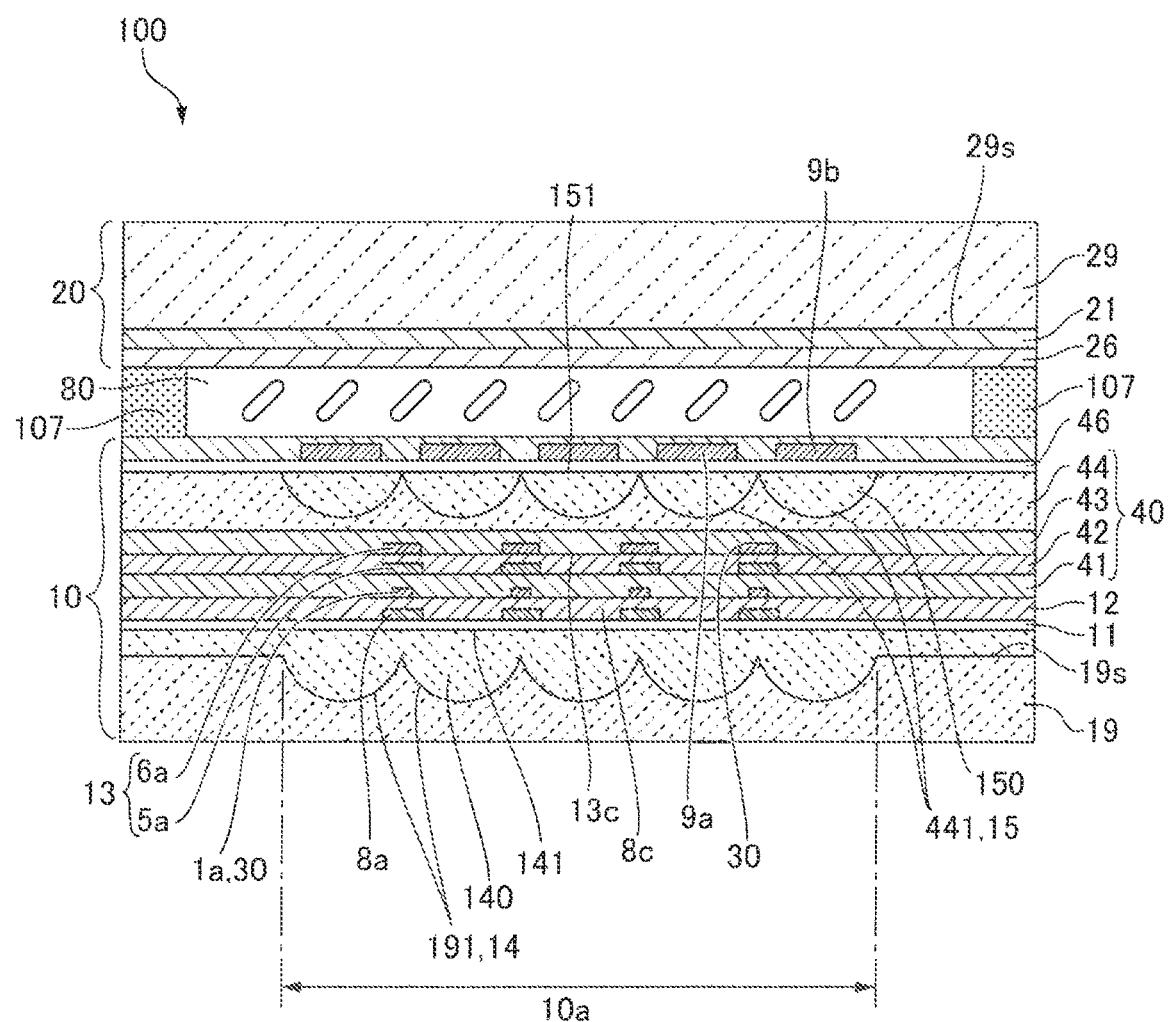
FIG. 7 is a diagram schematically illustrating, in a cross section, configurations of first lenses and second lenses of an element substrate illustrated in FIG. 2.
Figure 8:
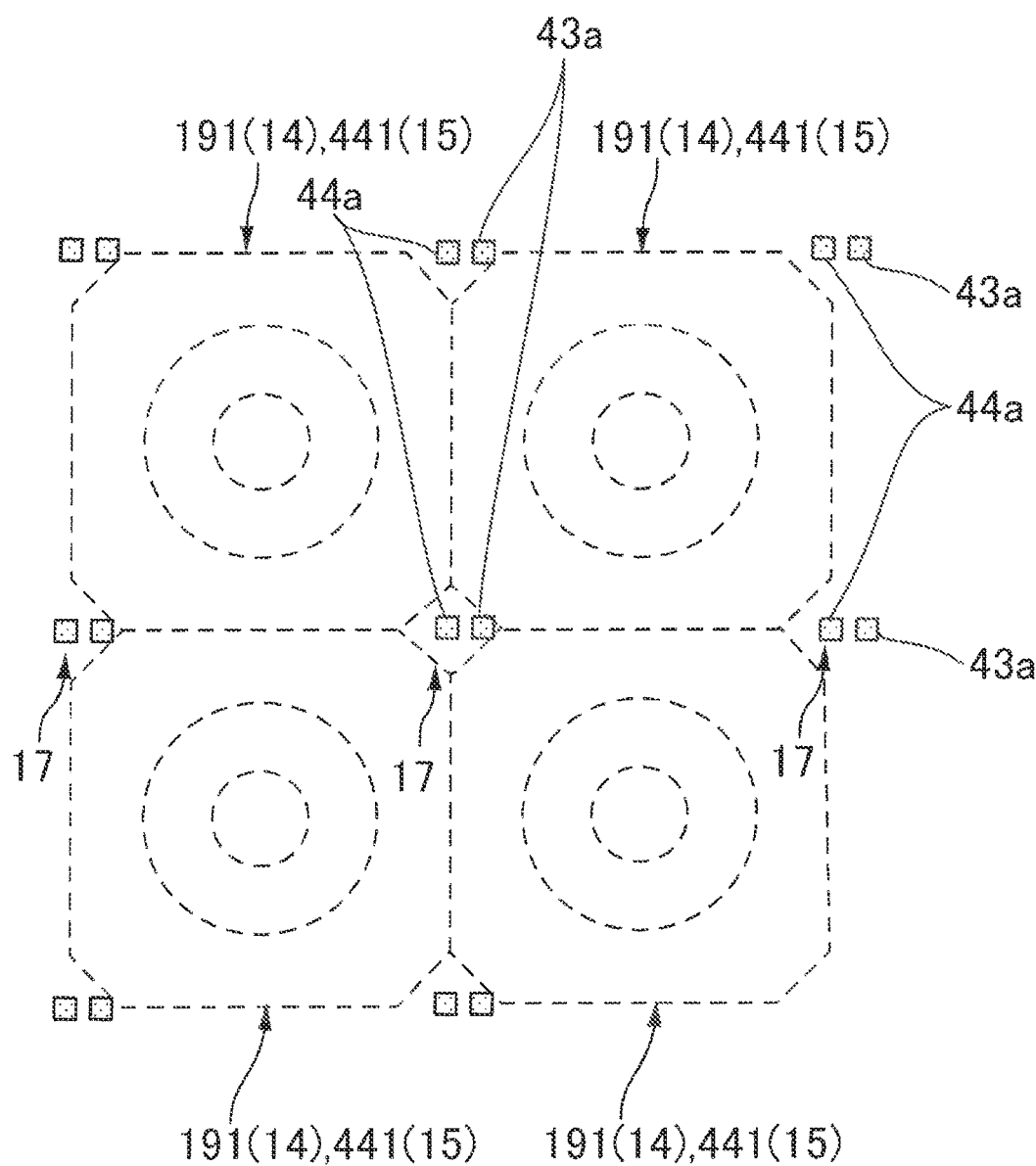
FIG. 8 is a diagram illustrating a positional relationship and the like, in a plan view, between the second lenses illustrated in FIG. 7 and contact holes.

FIG. 7 is a diagram schematically illustrating, in a cross section, configurations of the first lenses 14 and second lenses 15 of the element substrate 10 illustrated in FIG. 2. FIG. 8 is a diagram illustrating a positional relationship and the like, in a plan view, between the second lenses 15, illustrated in FIG. 7, and contact holes 43a and 44a.

As illustrated in FIGS. 6 and 7, the element substrate 10 is configured as a substrate for an electro-optical device, in which the first lenses 14 and the second lenses 15 are provided. In this exemplary embodiment, in the element substrate 10, as describe above with reference to FIG. 6 and the like, a plurality of interlayer insulating films 40 (interlayer insulating films 41, 42, 43, and 44) are formed between the first substrate 19 and the pixel electrodes 9a, and the switching elements 30 are formed between the first substrate 19 and the plurality of interlayer insulating films 40. The first lenses 14 are formed between the first substrate 19 and the switching elements 30. The first lenses 14 overlap, in a plan view, with the respective first apertures 8c, second apertures 13c, and pixel electrodes 9a. The second lenses 15 are formed between the switching elements 30 and the pixel electrodes 9a. The second lenses 15 overlap, in a plan view, with the respective first apertures 8c, second apertures 13c, and pixel electrodes 9a. Thus, the first lenses 14 overlap, in a plan view, with the respective second lenses 15. The first lens 14 has a positive power (positive refractive power) and the focal point of the first lens 14 is positioned closer to the first substrate 19 than the second lens 15 is. Thus, the second lens 15 has a positive power (positive refractive power).

Each of the first lenses 14 includes a first lens concave surface 191, which is formed on a surface (first surface 19s) on a surface of the switching elements 30 of the first substrate 19 and which has a concave curved surface, and a first lens-forming lens layer 140, which is filled in the concavities of the first lens concave surfaces 191. The first lens-forming lens layer 140 has a refractive index different from the refractive index of the first substrate 19. In this exemplary embodiment, the refractive index of the first lens-forming lens layer 140 is greater than the refractive index of the first substrate 19. For example, the first substrate 19 includes a quartz (silicon oxide, $SiO_2$) substrate and has a refractive index of 1.48, whereas the first lens-forming lens layer 140 includes a silicon oxynitride (SiON) film and has a refractive index from 1.58 to 1.68. Thus, the first lens 14 has power for converging light. The first lens-forming lens layer 140 is formed to extend outside of the first lens concave surfaces 191. A surface 141, on the opposite side of the first substrate 19 of the first lens-forming lens layer 140 is a flat surface.

The second lens 15 includes a second lens concave surface 441, which is made of a concave curved surface formed to be recessed toward the first substrate 19 from a surface of the interlayer insulating film 44 (first interlayer insulating film) on the pixel electrodes 9a side, and which is located closest to the pixel electrodes 9a among the plurality of interlayer insulating films 40. The second lens 15 also includes a second lens-forming lens layer 150, which is filled in a concavity of the second lens concave surface 441. The second lens-forming lens layer 150 has a refractive index different from the refractive index of the interlayer insulating film 44 (first interlayer insulating film). In this exemplary embodiment, the refractive index of the second lens-forming lens layer 150 is greater than the refractive index of the interlayer insulating film 44. For example, the interlayer insulating film 44 includes silicon oxide (SiO$_2$) and has a refractive index of 1.48, whereas the second lens-forming lens layer 150 includes a silicon oxynitride (SiON) film and has a refractive index from 1.58 to 1.68. Thus, the second lens 15 has power for converging light.

The second lens-forming lens layer 150 is formed only within the inside of each of the second lens concave surfaces 441, and thus a surface 151 of the second lens-forming lens layers 150 on the pixel electrode 9a side and a surface of the interlayer insulating film 44 on the pixel electrode 9a side constitute a continuous flat surface. Thus, the protective layer 46 made of a BSG film is deposited between the pixel electrodes 9a and the flat surface constituted by the surface 151 of the second lens-forming lens layers 150 on the pixel electrode 9a side and the surface of the interlayer insulating film 44 on the pixel electrode 9a side.

In this exemplary embodiment, the second lens concave surface 441 extends from the surface of the interlayer insulating film 44 on the pixel electrode 9a side to the interlayer insulating film 43 (second interlayer insulating film), which overlaps with the interlayer insulating film 44 in the first substrate 19. The bottom of the second lens concave surface 441 is located closer to the first substrate 19 than the relay electrode 7b.

As illustrated in FIG. 8, in a plan view, the first lens 14 (first lens concave surface 191) and the second lens 15 (second lens concave surface 441) are each formed in a circular shape having an apex at a location overlapping with a center of the pixel electrode 9a. The first lenses 14 and the second lenses 15 formed for adjacent pixel electrodes 9a are both in linear contact with each other in an X direction (extension direction of the scan lines 3a) and a Y direction (extension direction of the data lines 6a). In addition, neither the first lens 14 (first lens concave surface 191) nor the second lens 15 (second lens concave surface 441) is formed to reach the intersection region 17 where the scan line 3a intersects with the data line 6a. Thus, the size of the first lens 14 in a plan view is equal to the size of the second lens 15 in a plan view.

In this exemplary embodiment, the contact holes 44a, which are provided to electrically couple the pixel electrodes 9a to the switching elements 30, are disposed in locations not overlapping, in a plan view, with the second lens concave surface 441. More specifically, the second lens 15, in a plan view, is formed not to extend to reach the intersection region 17 where the scan line 3a intersects with the data line 6a, and the contact hole 44a is formed in the intersection region 17 where the scan line 3a intersects with the data line 6a.

To achieve such a configuration, in this exemplary embodiment, as illustrated in FIG. 4, the relay electrode 7b is formed in a quadrilateral shape and overlaps, in a plan view, with the intersection region 17 where the scan line 3a intersects with the data line 6a. In addition, each of the pixel electrodes 9a has a substantially quadrilateral shape in a plan view, and the four corner portions of the pixel electrode 9a are located on regions overlapping, in a plan view, with intersection regions 17 where the scan line 3a intersects with the data line 6a. The contact hole 44a is formed in a location overlapping, in a plan view, with both a corner portion 9a1, which is one of the four corner portions of the pixel electrode 9a, and the relay electrode 7b, in the intersection region 17 where the scan line 3a intersects with the data line 6a. In this exemplary embodiment, a projection 9a2, which projects toward a center of the intersection region 17, is formed at the corner portion 9a1 of the pixel electrode 9a. The corner portion 9a1 (projection 9a2) of the pixel electrode 9a is electrically coupled to the relay electrode 7b via the contact hole 44a.

Method for Producing First Lenses 14

Figure 9:
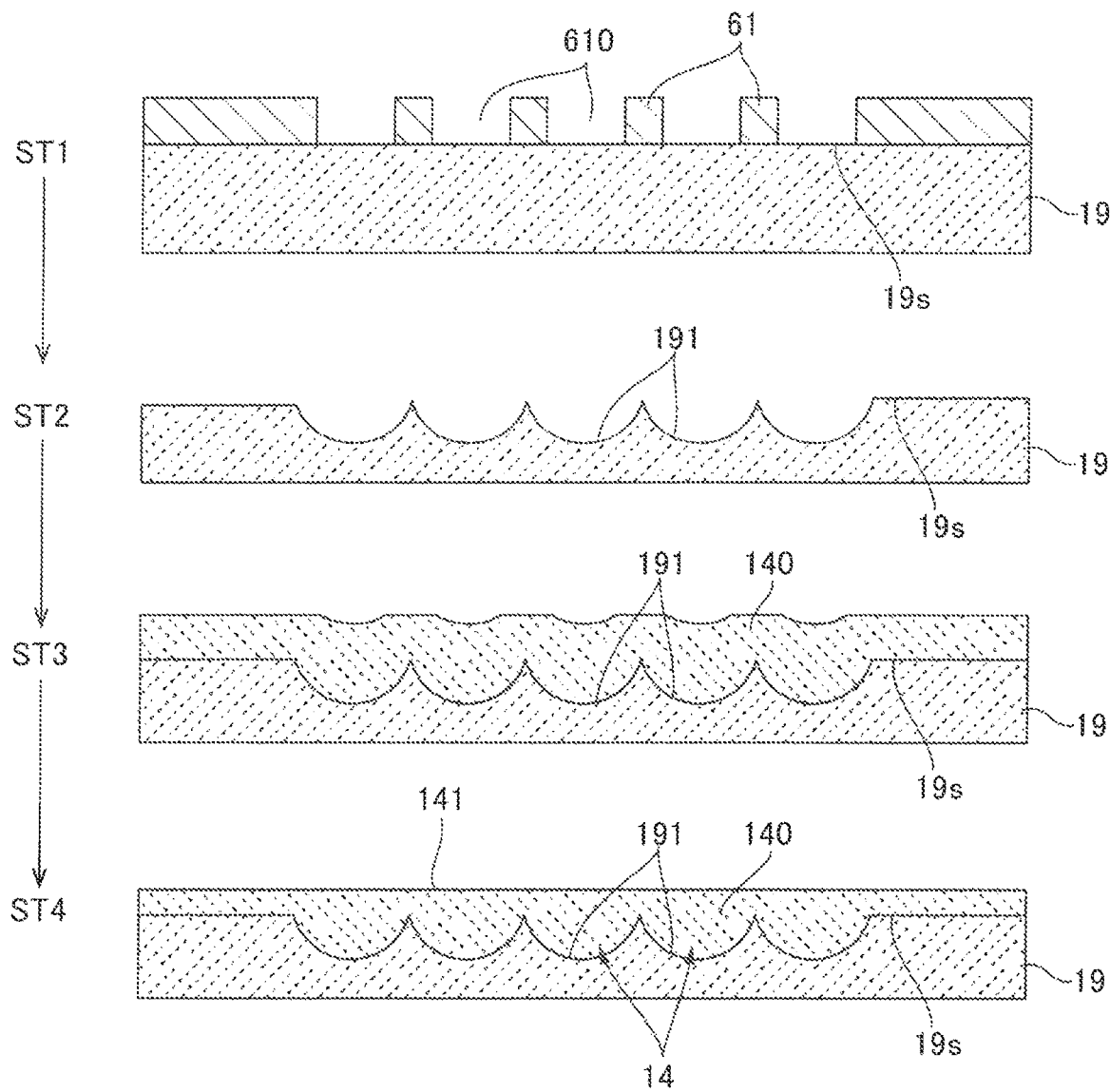

FIG. 9 is a cross-sectional view illustrating steps of a method for producing the first lenses 14, illustrated in FIG. 7 and the like. A mother substrate made of a quartz substrate larger than the first substrate 19 is used to produce the element substrate 10. In the description below, the mother substrate will be described also as the first substrate 19. In a process for producing the element substrate 10, to form the first lenses 14, first, in a mask formation step ST1 illustrated in FIG. 9, an etching mask 61 is formed over the first surface 19s of the first substrate 19. The etching mask 61 includes openings 610 in regions overlapping with formation regions for the first lenses 14. Next, in an etching step ST2, the first surface 19s of the first substrate 19 is etched from the openings 610 of the etching mask 61 to form the first lens concave surfaces 191. Thereafter, the etching mask 61 is removed. The etching step ST2 may be carried out by wet etching or by dry etching. In this exemplary embodiment, in the etching step ST2, wet etching is performed by using an etchant containing hydrofluoric acid.

Next, in a lens layer formation step ST3, the first lens-forming lens layer 140, which is light transmissive, is formed to fill the inside of the first lens concave surfaces 191 in the first surface 19s of the first substrate 19. In this exemplary embodiment, the first lens-forming lens layer 140 includes a silicon oxynitride (SiON) film formed by plasma CVD and the like.

Next, in a planarization step ST4, the first lens-forming lens layer 140 is planarized on the opposite side of the first substrate 19, so that the surface 141 of the first lens-forming lens layer 140 on the opposite side of the first substrate 19 can be a flat surface. As a result, the first lenses 14 are formed. In this exemplary embodiment, Chemical Mechanical Polishing (CMP) or the like is used as the planarization process. In the planarization step ST4, it is also possible that the planarization may be performed until the surface 141 of the first lens-forming lens layer 140 on the opposite side of the first substrate 19 constitute a continuous flat surface with the first surface 19s of the first substrate 19. In such a case, the first lens-forming lens layer 140 is formed only within the inside of the first lens concave surfaces 191, and thus the plurality of first lenses 14 are formed to be in a state of being independent of one another.

Subsequently, as described above with reference to FIG. 6, the insulating film 11, the light shielding layer 8a, the insulating film 12, the switching elements 30, and the like are sequentially formed.

Method for Producing Second Lenses 15

Figure 10:
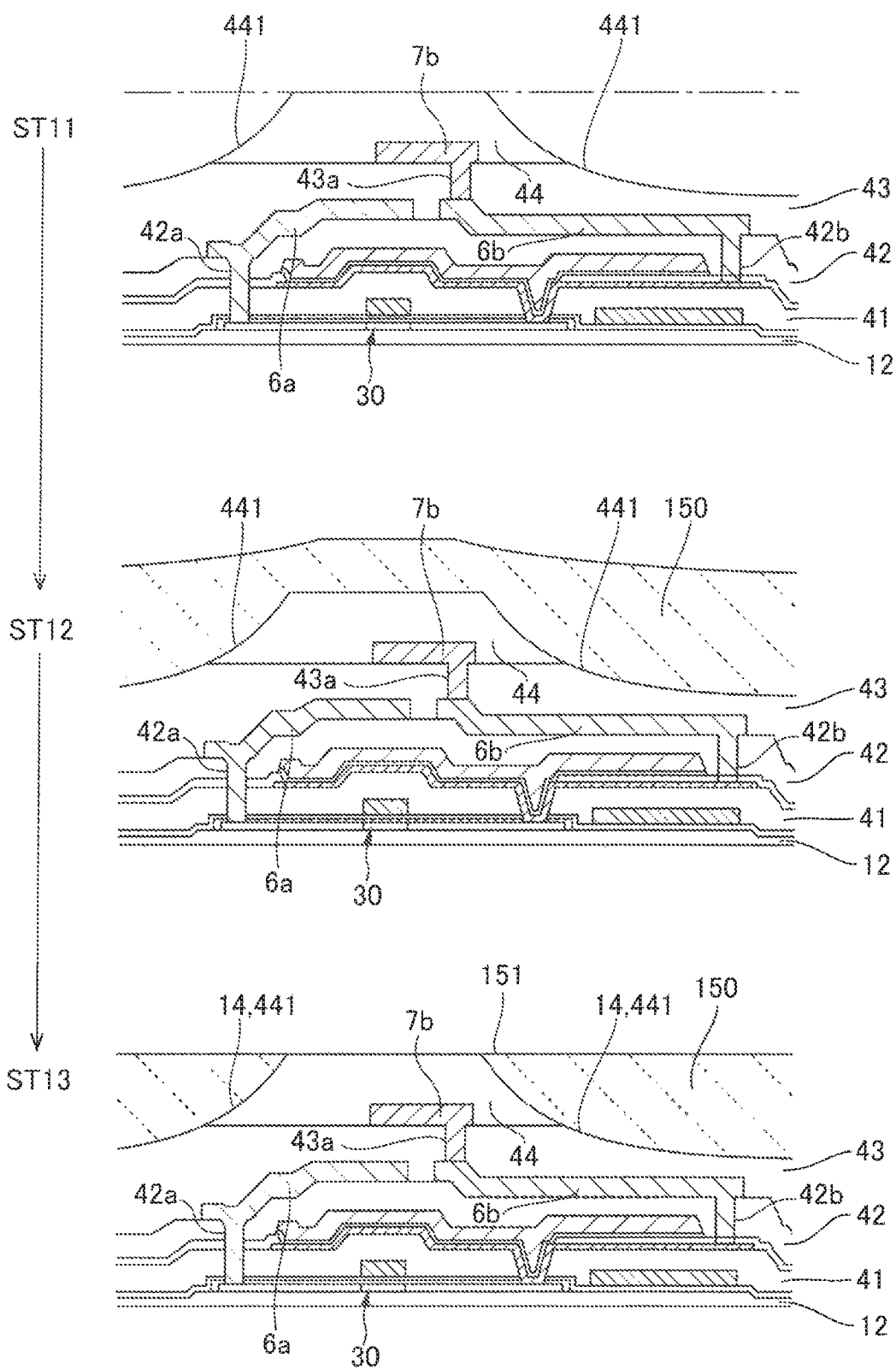

FIG. 10 is a cross-sectional view illustrating steps of a method for producing the second lenses 15 illustrated in FIG. 7 and the like. In the process for producing the element substrate 10, to form the second lenses 15, first, after the relay electrodes 7b and the interlayer insulating film 44 are formed, a concave curved surface formation step ST11 illustrated in FIG. 10 is performed to form the second lens concave surfaces 441. In the step, steps similar to the mask formation step ST1 and the etching step ST2, which have been described above with reference to FIG. 9, are performed.

Next, in a lens layer formation step ST12, the second lens-forming lens layers 150, which are light transmissive, are formed to fill the inside of the second lens concave surfaces 441 of the interlayer insulating film 44 on the opposite side of the first substrate 19. In this exemplary embodiment, the second lens-forming lens layers 150, as with the first lens-forming lens layer 140, are made of a silicon oxynitride (SiON) film formed by plasma CVD and the like.

Next, in a planarization step ST13, the second lens-forming lens layers 150 are planarized from the opposite side of the first substrate 19, so that the surface 151 of the second lens-forming lens layers 150 on the opposite side of the first substrate 19 can be a flat surface. In the step, the planarization is performed until the surface 151 of the second lens-forming lens layers 150 on the opposite side of the first substrate 19 and the surface of the interlayer insulating film 44 on the pixel electrodes 9a side that is on the opposite side of the first substrate 19 constitute a continuous flat surface. As a result, the second lens-forming lens layer 150 is formed only within the inside of each of the second lens concave surfaces 441, and thus the plurality of second lenses 15 are formed to be in a state of being independent of one another. In this exemplary embodiment, CMP or the like is used as the planarization process.

Subsequently, as described above with reference to FIG. 6, the protective layer 46, the contact holes 44a, and the pixel electrodes 9a are sequentially formed.

Major Effects of this Exemplary Embodiment

As described above, in the element substrate 10 (substrate for an electro-optical device) and the electro-optical device 100 of this exemplary embodiment, light emitted from, for example, a light source enters from the element substrate 10 side. Light that has entered the first lenses 14, out of the entered light, is refracted toward centers of the first apertures 8c of the light shielding layer 8a. Accordingly, the amount of light blocked by the light shielding layer 8a or the light shielding layer 13a is reduced, and consequently a bright display is enabled. In addition, since the light that has entered the first lenses 14 is refracted toward the first apertures 8c of the light shielding layer 8a, the entrance of light into the channel regions 1g of the switching elements 30 is suppressed. Consequently, malfunction due to photo current is inhibited from occurring in the switching elements 30.

Furthermore, the light converged by the first lenses 14 spreads radially to enter the second lenses 15, whereas light that is emitted from the second lenses 15 is refracted toward the center. Because of the refraction, the inclination angle of the light to enter the electro-optical layer 80 is reduced, and thus the phase shift in the electro-optical layer 80 is reduced. Thus, the contrast can be enhanced. In addition, since the inclination, with respect to the perpendicular direction, of the optical axis of the light that is emitted from the counter substrate 20 is reduced, optical vignetting due to the projection lens group (projection optical system) is prevented in a projection display apparatus, which will be described later.

Furthermore, the second lens 15 is configured such that the second lens-forming lens layer 150 is filled in the second lens concave surface 441, which is recessed toward the first substrate 19 from the surface of the interlayer insulating film 44 (first interlayer insulating film) on the pixel electrode 9a side. As a result, the depth of the contact holes 44a, which are formed in the interlayer insulating film 44 to electrically couple the pixel electrodes 9a to the switching elements 30, are substantially equal to the thickness of the interlayer insulating film 44 or the sum of the thickness of the interlayer insulating film 44, and the thickness of a portion deposited outside the second lens concave surface 441, of the second lens-forming lens layer 150. Consequently, the aspect ratio of the contact hole 44a is small, and thus, even in the case that the second lenses are disposed between the switching elements 30 and the pixel electrodes 9a, the pixel electrodes 9a are electrically coupled to the relay electrodes 7b appropriately. In particular, in this exemplary embodiment, the surfaces of the second lens-forming lens layers 150 and the surface of the interlayer insulating film 44 on the pixel electrode 9a side constitute a continuous flat surface, that is, the second lens-forming lens layer 150 is not formed outside the second lens concave surface 441. Thus, the depth of the contact hole 44a does not include the thickness of the second lens-forming lens layer 150. Consequently, the aspect ratio of the contact hole 44a is small, and thus the pixel electrodes 9a can be electrically coupled to the relay electrodes 7b appropriately.

In addition, each of the pixel electrodes 9a has a substantially quadrilateral shape in a plan view, and the contact holes 44a overlap, in a plan view, with the projections 9a2 of the corner portions 9a1 of the pixel electrodes 9a. Since the region between corner portions of two pixel electrodes 9a diagonally located is a region where the second lens concave surface 441 is not formed, the contact hole 44a can be easily provided in a location not overlapping with the second lens concave surface 441.

In addition, the second lens concave surface 441 extends from the surface of the interlayer insulating film 44 on the pixel electrode 9a side to reach the interlayer insulating film 43 (second interlayer insulating film 43). Thus, when the second lens concave surface 441 is designed, the design flexibility for the depth and the like of the second lens concave surface 441 is high. Consequently, the lens properties of the second lenses 15 can be designed appropriately.

In addition, the protective layer 46, which is made of a BSG film and is insulating, is formed between the second lens-forming lens layers 150 and the pixel electrodes 9a. The BSG films (protective layer 46) are highly hygroscopic. Consequently, moisture penetrating into the electro-optical layer 80 can be adsorbed by the protective layer 46.

In addition, since the element substrate 10 (first substrate 19) is provided with the first lenses 14 and the second lenses 15, the counter substrate 20 (second substrate 29) may not be necessarily provided with lenses. Consequently, the occurrence of an issue that the positional relationship of a plurality of lenses is not optimized, which is caused by a positional displacement occurring when the element substrate 10 and the counter substrate 20 are bonded together, can be prevented.

Another Exemplary Embodiment

Figure 11:
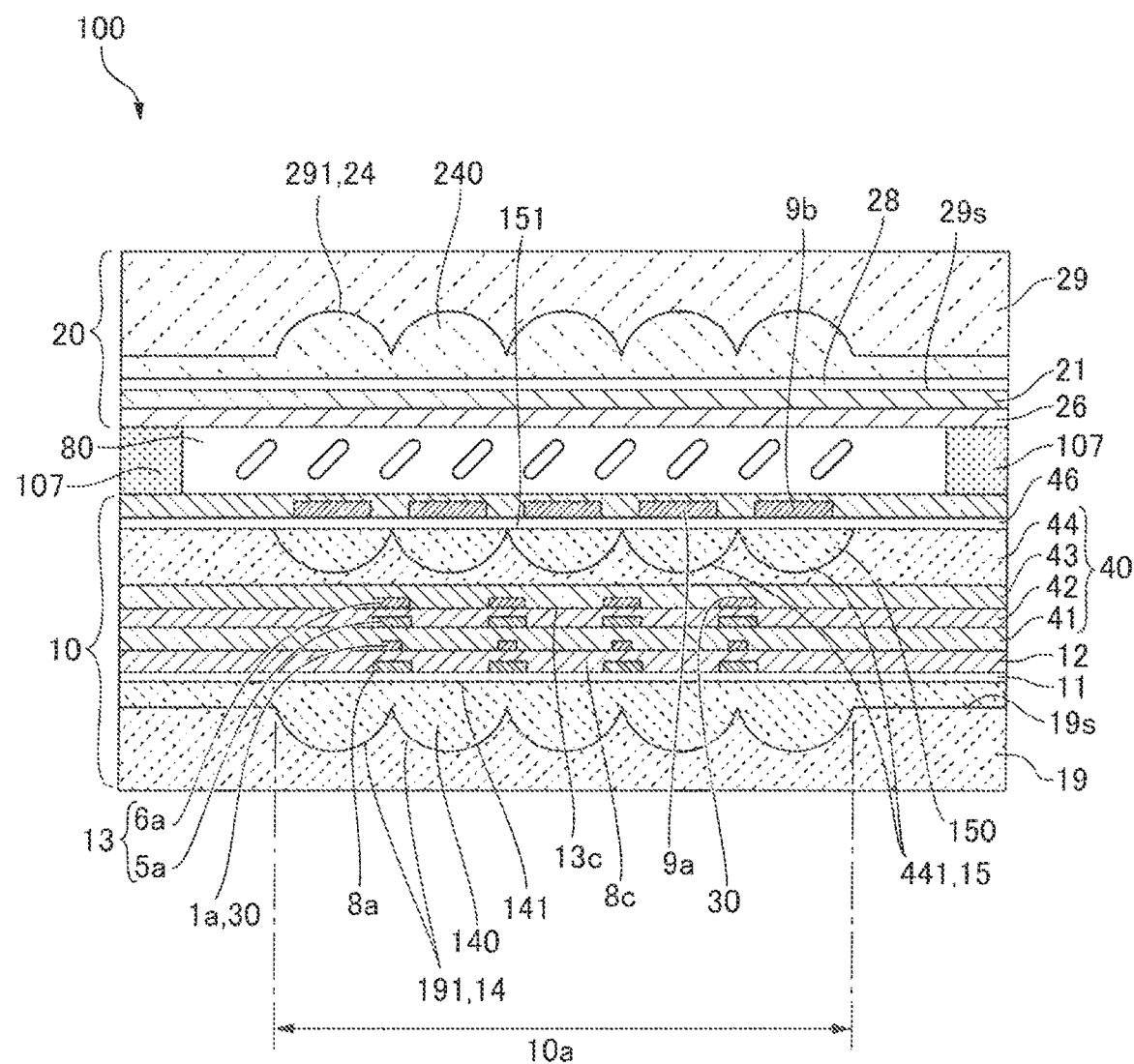
FIG. 11 is a diagram schematically illustrating, in a cross section, a configuration of an electro-optical device according to another exemplary embodiment of the disclosure.

FIG. 11 is a diagram schematically illustrating, in a cross section, a configuration of an electro-optical device 100 according to another exemplary embodiment of the disclosure. Note that the general configuration of this exemplary embodiment is similar to the configuration described above with reference to FIG. 7 and the like, and thus like parts are designated by like reference characters, and a description of such parts is omitted. As illustrated in FIG. 11, also in this exemplary embodiment, the element substrate 10 is configured as a substrate for an electro-optical device, in which the first lenses 14 and the second lenses 15 are provided, as with the configuration illustrated in FIG. 7. In this exemplary embodiment, third lenses 24, which overlap with the respective first lenses 14 and second lenses 15, in a plan view, are formed in the counter substrate 20. Here, the third lens 24 has a positive power. Thus, the inclination, with respect to the perpendicular direction, of the optical axis of the light that is emitted from the counter substrate 20 is reduced, and as a result, optical vignetting due to a projection lens group 2114 (projection optical system) can be suppressed in a projection display apparatus 2100, which will be described later.

In this exemplary embodiment, for formation of the third lenses 24, third lens concave surfaces 291 are formed on a surface (first surface 29s) of the second substrate 29 on the element substrate 10 side, and a third lens-forming lens layer 240, which is filled in the inside of the third lens concave surfaces 291, are formed. The third lens-forming lens layer 240 has a refractive index different from the refractive index of the second substrate 29. In this exemplary embodiment, the refractive index of the third lens-forming lens layer 240 is greater than the refractive index of the second substrate 29. For example, the second substrate 29 includes a quartz (silicon oxide, $SiO_2$) substrate and has a refractive index of 1.48, whereas the third lens-forming lens layer 240 includes a silicon oxynitride (SiON) film and has a refractive index from 1.58 to 1.68. Thus, the third lens 24 has power for converging light.

In addition, according to this exemplary embodiment, the third lenses 24 are disposed in the second substrate 29, and as a result, light impinging on the light shielding portions such as line layers and the like, of the light entering from the second substrate 29 side, is prevented. Thus, even in the case that the electro-optical device 100 is used as a liquid crystal device configured to accept light incident from the second substrate 29 side (counter substrate 20 side), the light utilization efficiency is high. In addition, when light enters the element substrate 10 from the counter substrate 20 side, the light is refracted in the second lenses 15 in the element substrate 10 and passes through the second apertures 13c and the first apertures 8c. As a result, the light utilization efficiency is enhanced. In addition, the inclination of the optical axis of the light that is emitted from the element substrate 10 is reduced by the first lenses 14.

Other Exemplary Embodiments

In the exemplary embodiments described above, the size of the first lens 14 and the size of the second lens 15, in a plan view, are the same. However, in a plan view, the first lens 14 may have a size larger than the size of the second lens 15. With this exemplary embodiment, the utilization efficiency of light incident from the element substrate 10 side is increased.

In the exemplary embodiments described above, the second lens 15 has a positive power. According to other exemplary embodiments, the second lens 15 may have a negative power, depending on the position of the focal point of the first lens 14, and the like. In such a case, the refractive index of the second lens-forming lens layer 150 may be smaller than the refractive index of the interlayer insulating film 44. In the exemplary embodiments described above, both the first lens concave surface 191 and the second lens concave surface 441 are an entirely curved surface. However, the disclosure may be applied a configuration in which at least one of the first lens concave surface 191 and the second lens concave surface 441 has a bottom portion that constitutes a flat surface.

Example of Installation to Electronic Apparatus

Figure 12:
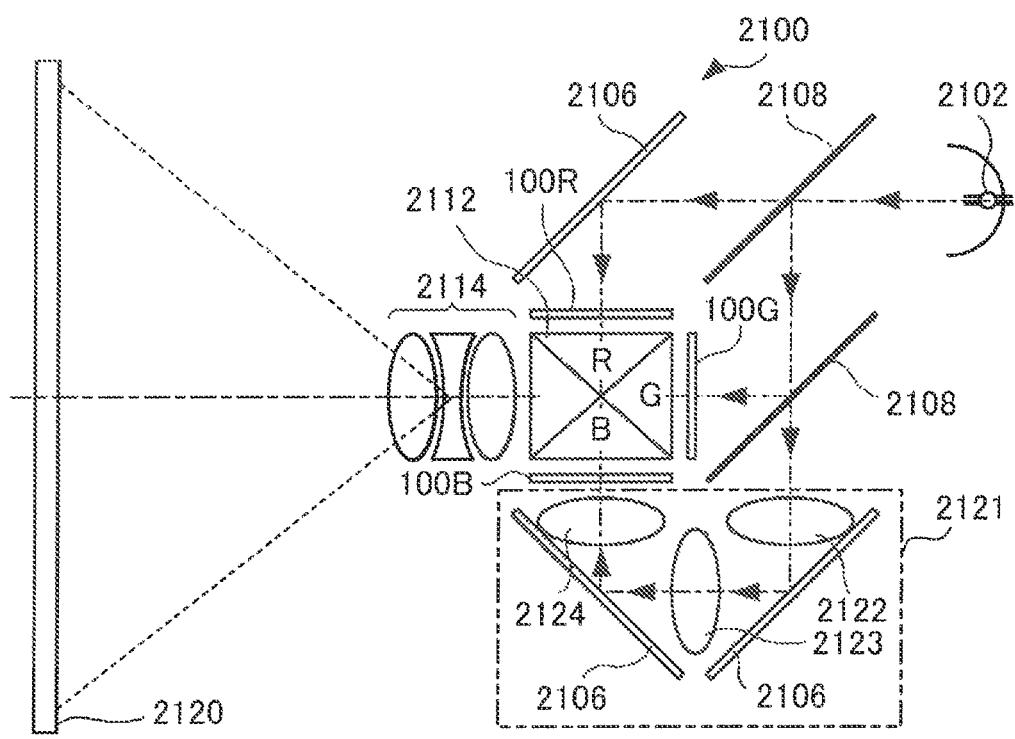
FIG. 12 is a schematic configuration diagram of a projection display apparatus (electronic apparatus) utilizing an electro-optical device to which the disclosure is applied.

An electronic apparatus utilizing the electro-optical device 100 according to the above-described exemplary embodiment will be described. FIG. 12 is a schematic configuration diagram of a projection display apparatus (electronic apparatus) utilizing an electro-optical device 100, which incorporates the disclosure. A projection display apparatus 2100, illustrated in FIG. 12, is an example of an electronic apparatus utilizing the electro-optical device 100. The electro-optical device 100 is used as a light valve in the projection display apparatus 2100 and enables a bright, high-resolution display without increasing the size of the apparatus. As illustrated in FIG. 16, a lamp unit 2102 (light source unit) is disposed within the projection display apparatus 2100. The lamp unit 2102 may be, for example, a halogen lamp and includes a white light source. Projection light emitted from the lamp unit 2102 is split into light components of three primary colors, red (R), green (G), and blue (B) by using three mirrors 2106 and two dichroic mirrors 2108, which are disposed within the apparatus. The split components of the projection light are each guided to a corresponding light valve, 100R, 100G, or 100B, which corresponds to one of the primary colors, and are modulated. The optical path length of the light component of B is longer than the optical path lengths of the light components of R and G. Thus, in order to prevent loss of the light component of B, the light component of B is guided through a relay lens system 2121, which includes an entrance lens 2122, a relay lens 2123, and an exit lens 2124.

The light components modulated by the respective light valves, 100R, 100G, and 100B, enter a dichroic prism 2112 from three directions. The light components of R and B are reflected at 90 degrees by the dichroic prism 2112 and the light component of G transmits through the dichroic prism 2112. Thus, after images of the respective primary colors are combined, a color image is projected on a screen 2120 by a projection lens group 2114 (projection optics).

Other Projection Display Apparatuses

The projection display apparatus may have another configuration. The light source unit may include, for example, LED light sources each of which emits light of a corresponding one of the colors, and the color light components emitted from the LED light sources may be supplied to respective liquid crystal devices.

Other Electronic Apparatuses

The electronic apparatus including the electro-optical device 100, which incorporates the disclosure, is not limited to the projection display apparatus 2100 of the exemplary embodiment described above. Examples of the electronic apparatus include projection-type head-up displays (HUDs), direct-view head-mounted displays (HMDs), personal computers, digital still cameras, liquid crystal televisions, and other electronic apparatuses.

What is claimed is:
1. A substrate for an electro-optical device, the substrate comprising:
  a first substrate;
  a pixel electrode provided on a first surface side of the first substrate;
  a plurality of interlayer insulating films stacked between the first substrate and the pixel electrode;
  a switching element provided between the first substrate and the plurality of interlayer insulating films, the switching element being electrically connected to the pixel electrode;

a first lens between the first substrate and the switching element, the first lens overlapping, in plan view, with the pixel electrode; and a second lens between the switching element and the pixel electrode, the second lens overlapping, in plan view, with the pixel electrode, wherein the second lens includes a second lens surface and a second lens layer, the second lens surface being recessed toward the first substrate from a surface of a pixel electrode side of a first interlayer insulating film of the plurality of interlayer insulating films, the second lens layer being filled in an inside of the recessed second lens surface, and the second lens layer having a refractive index different from a refractive index of the first interlayer insulating film, the first interlayer insulating film includes a contact hole in a location not overlapping, in plan view, with the second lens surface, the pixel electrode is electrically coupled to the switching element via the contact hole, and a depth of the contact hole is shallower than a thickness of the second lens layer such that an aspect ratio of the contact hole enables the electrical coupling of the pixel electrode to a relay electrode.

2. The substrate for the electro-optical device according to claim 1, wherein the pixel electrode has a substantially quadrilateral shape in plan view, and the contact hole overlaps, in plan view, with a corner portion of the pixel electrode.

3. The substrate for the electro-optical device according to claim 1, wherein a surface of the pixel electrode side of the second lens layer and the surface of the pixel electrode side of the first interlayer insulating film constitute a continuous flat surface.

4. The substrate for the electro-optical device according to claim 1, wherein a relay electrode electrically connected to the switching element is provided between a second interlayer insulating film of the plurality of interlayer insulating films and the first interlayer insulating film, the second interlayer insulating film overlapping with the first interlayer insulating film on a first substrate side, and the pixel electrode is electrically connected to the relay electrode via the contact hole.

5. The substrate for the electro-optical device according to claim 4, wherein the second lens surface reaches the second interlayer insulating film.

6. The substrate for the electro-optical device according to claim 1, wherein the first lens has a first size that is larger than a second size of the second lens in plan view.

7. The substrate for the electro-optical device according to claim 1, further comprising:

an insulating protective layer formed between the second lens layer and the pixel electrode.

8. The substrate for the electro-optical device according to claim 1, wherein the first lens includes a first lens surface, and includes a first lens layer filled in an inside of the first lens surface.

9. The substrate for the electro-optical device according to claim 1, further comprising:

a light shielding layer provided between the switching element and the first substrate, the light shielding layer including an aperture that overlaps, in plan view, with the first lens, wherein the light shielding layer overlaps, in plan view, with the switching element.

10. An electro-optical device comprising:

the substrate according to claim 1.

11. An electronic apparatus comprising:

the electro-optical device according to claim 10.

12. A substrate for an electro-optical device, the substrate comprising:

a first substrate;

a pixel electrode of the first substrate on a first surface side;

a plurality of interlayer insulating films stacked between the first substrate and the pixel electrode;

a switching element electrically connected to the pixel electrode provided between the first substrate and the plurality of interlayer insulating films; and a lens provided between the switching element and the pixel electrode, the lenses overlapping, in plan view, with the pixel electrode, wherein:

the lens includes a lens surface and a lens layer, the lens surface being recessed toward the first substrate from a surface of a pixel electrode side of a first interlayer insulating film of the plurality of interlayer insulating films, and the lens layer being filled in an inside of the recessed lens surface, the first interlayer insulating film includes a contact hole in a location not overlapping, in plan view, with the lens surface, the pixel electrode is electrically coupled to the awitching element via the contact hole, and a depth of the contact hole is shallower than a thickness of the lens layer such that an aspect ratio of the contact hole enables the electrical coupling of the pixel electrode to a relay electrode.

13. The substrate for the electro-optical device according to claim 12, wherein a surface of the pixel electrode side of the lens and the surface of the pixel electrode side of the first interlayer insulating film constitute a continuous flat surface.

14. The substrate for the electro-optical device according to claim 12, wherein the lens reaches a second interlayer insulating film.

15. An electro-optical device comprising:

the substrate according to claim 12.

16. An electronic apparatus comprising the electro-optical device according to claim 15.

* * * * *